(12) United States Patent
Pfaff et al.

(10) Patent No.: US 9,145,286 B2
(45) Date of Patent: Sep. 29, 2015

(54) METHOD FOR OPERATING AN AUTONOMOUS INDUSTRIAL TRUCK

(75) Inventors: Patrick Pfaff, Augsburg (DE); Christoph Sprunk, Bollschweil (DE)

(73) Assignee: KUKA Roboter GmbH, Augsburg (DE)

( * ) Notice: Subject to any disclaimer, the term of this patent is extended or adjusted under 35 U.S.C. 154(b) by 227 days.

(21) Appl. No.: 13/636,210

(22) PCT Filed: Mar. 14, 2011

(86) PCT No.: PCT/EP2011/053793
§ 371 (c)(1),
(2), (4) Date: Sep. 20, 2012

(87) PCT Pub. No.: WO2011/117098
PCT Pub. Date: Sep. 29, 2011

(65) Prior Publication Data
US 2013/0060415 A1    Mar. 7, 2013

(30) Foreign Application Priority Data
Mar. 25, 2010    (DE) .......................... 10 2010 012 749

(51) Int. Cl.
*G05D 1/00*    (2006.01)
*B66F 9/06*    (2006.01)
(Continued)

(52) U.S. Cl.
CPC ............... *B66F 9/063* (2013.01); *B66F 17/003* (2013.01); *G01S 17/936* (2013.01); *G01S 2013/9346* (2013.01)

(58) Field of Classification Search
CPC .......... B61L 29/28; B60N 2/002; B60C 11/24
USPC ............ 701/23, 50, 301, 498; 367/99, 96, 93, 367/108, 105; 342/71; 180/169, 168, 401, 180/167; 104/88; 340/904, 903; 208/408; 15/319; 172/4.5
See application file for complete search history.

(56) References Cited

U.S. PATENT DOCUMENTS 3,493,920 A * 2/1970 MacMunn ...................... 367/96
3,725,921 A * 4/1973 Weidman et al. ............... 342/71
(Continued)

FOREIGN PATENT DOCUMENTS

DE    3730105 A1    3/1989
DE    3830790 A1    3/1990
(Continued)

OTHER PUBLICATIONS

European Patent Office; Search Report in International Patent Application No. PCT/EP2011/053793 dated Jul. 12, 2011; 6 pages.
(Continued)

*Primary Examiner* — Thomas G Black
*Assistant Examiner* — Wae Louie
(74) *Attorney, Agent, or Firm* — Wood, Herron & Evans, LLP (57) ABSTRACT

The invention relates to a method for operating an autonomous industrial truck (1), having the following method steps: determining, by means of a measuring apparatus (6) of the autonomous industrial truck (1), whether the industrial truck potentially hits at least one obstacle (7) on the basis of the present movement of said industrial truck (1), determining that point (14) of the industrial truck (1), and determining a maximum velocity for the present movement of the industrial truck (1) on the basis of the determined distance (d), with the result that the industrial truck reliably comes to a standstill in front of the obstacle (7) on the basis of possible braking of the industrial truck (1).

12 Claims, 2 Drawing Sheets

(51) Int. Cl.
*B66F 17/00* (2006.01)
*G01S 17/93* (2006.01)
*G01S 13/93* (2006.01)

(56) References Cited

U.S. PATENT DOCUMENTS

| | | | | |
|---|---|---|---|---|
| 3,749,197 | A | * | 7/1973 | Deutsch .................. 180/169 |
| 3,806,861 | A | * | 4/1974 | Okumura et al. ................ 367/2 |
| 3,935,922 | A | * | 2/1976 | Cooper et al. ............... 180/168 |
| 4,279,563 | A | * | 7/1981 | Miller ......................... 414/611 |
| 4,361,202 | A | * | 11/1982 | Minovitch ................... 180/168 |
| 4,465,155 | A | * | 8/1984 | Collins ....................... 180/169 |
| 4,636,996 | A | * | 1/1987 | Tsuji ............................. 367/93 |
| 4,658,385 | A | * | 4/1987 | Tsuji ........................... 367/105 |
| 4,707,297 | A | * | 11/1987 | Paske et al. .............. 252/301.16 |
| 4,818,887 | A | * | 4/1989 | Weishaupt et al. ...... 250/559.38 |
| 4,920,520 | A | * | 4/1990 | Gobel et al. ................... 367/99 |
| 5,327,345 | A | * | 7/1994 | Nielsen et al. ................ 701/50 |
| 5,410,479 | A | * | 4/1995 | Coker ........................... 701/23 |
| 5,430,651 | A | * | 7/1995 | Nielsen et al. ................ 701/50 |
| 5,767,793 | A | * | 6/1998 | Agravante et al. ........... 340/903 |
| 6,574,536 | B1 | * | 6/2003 | Kawagoe et al. ............. 701/23 |
| 6,933,837 | B2 | * | 8/2005 | Gunderson et al. .......... 340/436 |
| 7,076,346 | B2 | * | 7/2006 | Sturges et al. ................. 701/23 |
| 7,138,938 | B1 | * | 11/2006 | Prakah-Asante et al. ....... 342/70 |
| 7,275,431 | B2 | * | 10/2007 | Zimmermann et al. ........ 73/510 |
| 7,603,235 | B2 | * | 10/2009 | Makela et al. ................ 701/301 |
| 8,599,001 | B2 | * | 12/2013 | Schofield et al. .......... 340/425.5 |
| 2004/0249571 | A1 | * | 12/2004 | Blesener et al. ............. 701/301 |
| 2005/0125117 | A1 | * | 6/2005 | Breed ............................. 701/29 |
| 2005/0273218 | A1 | * | 12/2005 | Breed et al. ..................... 701/2 |
| 2005/0278098 | A1 | * | 12/2005 | Breed ............................. 701/45 |
| 2010/0104199 | A1 | * | 4/2010 | Zhang et al. ................. 382/199 |
| 2010/0191391 | A1 | * | 7/2010 | Zeng ................................ 701/1 |
| 2013/0060415 | A1 | * | 3/2013 | Pfaff et al. ..................... 701/23 |

FOREIGN PATENT DOCUMENTS

| | | | |
|---|---|---|---|
| DE | 4408982 | C1 | 5/1995 |
| De | 601 03 191 | T2 | 1/2005 |
| DE | 19747799 | B4 * | 12/2005 |
| DE | 19744185 | B4 * | 10/2006 |
| DE | 102005062263 | * | 7/2007 |
| DE | 20 2007 016 156 | U1 | 3/2008 |
| DE | 10 2008 036 009 | A1 | 10/2009 |
| EP | 0351807 | A1 | 1/1990 |
| ES | 2155794 | A1 * | 5/2001 |
| GB | 2157436 | A | 10/1985 |
| RU | 2011443 | C1 * | 4/1994 |
| WO | WO 9404941 | A1 * | 3/1994 ............. G01S 13/04 |

OTHER PUBLICATIONS

German Patent Office; Office Action in German Patent No. 10 2010 012 749.3 dated Nov. 15, 2011; 5 pages.

Proceedings 2002 IEEE International Conference on Robotics and Automation (Cat. No. 02CH37292), 20020101 IEEE—ISBN 978-0-7803-7272-6 ; ISBN 780372723.

* cited by examiner

METHOD FOR OPERATING AN AUTONOMOUS INDUSTRIAL TRUCK

The invention relates to a method for operating an autonomous industrial truck.

K. O. Arras et al. describe in "Real-Time Obstacle Avoidance For Polygonal Robots With A Reduced Dynamic Window," Proceedings of the 2002 IEEE International Conference on Robotics Automation, Washington, D.C., May 2002, pages 3050-3055, a method for avoiding a collision of a mobile robot with one or several obstacles.

The task of the invention is to give an improved method for operating an autonomous industrial truck, in particular a holonomic or omni-directional industrial truck.

The task of the invention is solved by a method for operating an autonomous industrial truck having the following method steps:

By means of a measuring apparatus of the autonomous industrial truck, to determine whether on the basis of the present movement of the industrial truck it potentially will collide with at least one obstacle;

To determine the point or points of the industrial truck with which the obstacle potentially collides;

To determine the distance covered by the movement between the obstacle and the point on the body of the industrial truck; and To determine a maximum velocity for the present desired movement of the industrial truck on the basis of the determined distance, with the result that the industrial truck reliably comes to a standstill in front of the obstacle on the basis of possible braking of the industrial truck.

Another aspect of the invention relates to an autonomous transportation vehicle, which has a basic vehicle body on which wheels are set up, at least one drive for driving at least one of the wheels, a measuring apparatus that is set up to determine whether on the basis of the current movement of the industrial truck it will potentially collide with an obstacle, and a steering apparatus connected to the measuring apparatus that is set up to control the drive, and that is set up to operate the industrial truck according to the method of the invention.

The industrial truck is in particular set up as a holonomic/omni-directional industrial truck, that is, as a vehicle that can move omnidirectionally, and move not only lengthwise according to its orientation but also at any angle related to its orientation. In particular it is possible with such a vehicle to perform a complete rotation around any selected roll center and thereby at the same time to move translationally. In the case of the holonomic industrial truck, this has in particular 3 or more wheels that can be moved independently of each other, for example by means of individual drives that are controlled by the steering apparatus. The wheels preferentially can be set up as omni-directional wheels.

According to the method of the invention, it will thereby be determined whether there is an obstacle on the movement path of the industrial truck, thus whether a collision of the industrial truck with the obstacle is imminent in the current commanded movement direction in 3 degrees of freedom, translation and rotation. The measuring apparatus includes for example a laser scanner.

On the basis of the signals created by the measurement apparatus, the point or points of the industrial truck will be determined with which the obstacle will collide if the current movement form is maintained. On the basis of this information, the maximum velocity in the 3 degrees of freedom of the industrial truck are adjusted automatically, so that these if necessary can be maintained in time in front of the obstacle without colliding with the obstacle, but at the same time maintaining the original movement form (up to the speed of the performance).

Determination of the distance between the obstacle and the industrial truck preferentially takes place in the truck's coordinates. The source of this vehicle coordinate system preferentially lies in the center or in the middle point of the industrial truck. In this way the location of the potential collision of the industrial truck with the obstacle can be determined in a relatively simple fashion.

A model of the contour of the vehicle can be used for determining the location of the vehicle. The contour of the industrial truck can in particular be modeled using straight or arc-shaped pieces, whereby the point lies on the modeled contour.

If necessary, it is sufficient if the contour of the industrial truck is approximated as a rectangle, according to an embodiment of the method according to the invention.

The movement of the industrial truck runs preferentially on a circular path without a set roll center. That is, the industrial truck can describe a circular movement around any point in the plane of its movement. It is however also possible that the movement runs along a straight line, which corresponds to a circle with an infinite radius. For constant velocities, the movement of the industrial truck, set up in particular as a holonomically mobile platform, can be described by rotation around any point in the plane and a 2-dimensional translation. It is also possible that for constant velocities the movement of the industrial truck, set up in particular as a holonomically mobile platform, can be described by a circular path, whereby the orientation of the vehicle can be in any movement direction, and thus not necessarily tangential to the performed circular path.

To avoid a collision with the obstacle, the desired velocities in particular near the obstacles should be reduced in a way that collisions can be avoided. The origin of the vehicle's coordinate system for the following calculations preferentially is found in the midpoint of the mobile vehicle (industrial truck).

According to one embodiment of the method according to the invention, the movement of the obstacle relative to the industrial truck is defined by the equation $$r_0^2 = (x-x_m)^2 + (y-y_m)^2$$

whereby the industrial truck moves along a circular path with a radius r around the roll center with the vehicle's coordinates $(x_m, y_m)$ and the position of the vehicle is described with the vehicle's coordinates $(x, y)$, and $r_0$ is the distance of the vehicle from the role center.

Then it is possible to determine the coordinates $(x_c : y_c)$ of the point at which the obstacle will potentially collide with the vehicle contour on the basis of the equation $$r_0^2 = (x_c-x_m)^2 + (y_c-y_m)^2$$

If the contour of the industrial truck is modeled as a rectangle with straight pieces, as is envisaged according to one variant of the method according to the invention, whereby the front side of the industrial truck is modeled with a straight piece, the back side of the industrial truck with a second straight piece, the left side of the industrial truck with a third straight piece, and the fourth side of the industrial truck model with a fourth straight piece, then the coordinates of the point can be calculated as:

$$x_c = x_{vor}; \; y_c = y_m \pm \sqrt{r_0^2 - (x_{vor} - x_m)},$$

if the point is set on the first straight piece, $$x_c = x_{rück}; \; y_c = y_m \pm \sqrt{r_0^2 - (x_{rück} - x_m)},$$

if the point is set on the second straight piece, $$x_c = x_{links}, y_c = y_m \pm \sqrt{r_0^2 - (x_{links} - x_m)},$$

if the point is set on the third straight piece, $$x_c = x_{rechts}, y_c = y_m \pm \sqrt{r_0^2 - (x_{rechts} - x_m)},$$

if the point I set on the fourth straight piece.

It is also possible for the industrial truck to move along a straight line in an angle relative to its orientation. Then, $$\begin{pmatrix} v_x \\ v_y \end{pmatrix} = \begin{pmatrix} \cos\alpha \\ \sin\alpha \end{pmatrix}$$

is a vector that represents the movement direction within the vehicle's coordinate system, so that the trajectory of the obstacle is determined by $$\begin{pmatrix} x \\ y \end{pmatrix} = \begin{pmatrix} x_0 \\ y_0 \end{pmatrix} + u \cdot \begin{pmatrix} v_x \\ v_y \end{pmatrix}; u \in R].$$

According to one embodiment of the method according to the invention, the positions of the potential points are set according to the following rule:

If $v_x > 0$, then the point potentially is found on the front side of the vehicle, corresponding to the first straight piece, If $v_x < 0$, then the point potentially is found on the rear side of the vehicle, corresponding to the second straight piece, If $v_y > 0$, then the point potentially is found on the left side of the vehicle, corresponding to the third straight piece, If $v_y < 0$, then the point potentially is found on the right side of the vehicle, corresponding to the fourth straight piece.

If the coordinates of the potential point are determined, then the distance between the point and the obstacle can be found according to the following rule:

If the point lies on the first straight piece, then the coordinates for the point are $$x_c = x_{vor} \text{ and } y_c = y_0 + d \cdot v_y$$

and the distance is $$d = \frac{x_{vor} - x_0}{v_x}.$$

If the point lies on the second straight piece, then the coordinates for the point are $$x_c = x_{rück} \text{ and } y_c = y_0 + d \cdot v_y$$

and the distance is $$d = \frac{x_{rück} - x_0}{v_x}.$$

If the point lies on the third straight piece, then the coordinates for the point are $$y_x = y_{links} \text{ and } x_c = x_0 + x_0 + d \cdot v_x$$

and the distance is $$d = \frac{y_{links} - y_0}{v_y}.$$

If the point lies on the fourth straight piece, then the coordinates for the point are $$y_c = y_{links} \text{ and } x_c = x_0 + d \cdot v_x$$

and the distance is $$d = \frac{y_{rechtss} - y_0}{v_y}.$$

If the contour of a vehicle edge of the industrial truck is in parametrized form relative to the vehicle's coordinate system as follows:

$$\begin{pmatrix} a \\ b \end{pmatrix} + t \cdot \begin{pmatrix} k_x \\ k_y \end{pmatrix}; t \in [t_{start}, t_{end}],$$

whereby $(k_x, k_y)^T$ is the direction vector of the edge in the vehicle's coordinate system and the parametrization for the values $t \in [{}^{end}_{start}, t_{ende}]$ runs along the edge. By cutting the circle that is described by the equation $$r_0^2 = (x - x_m)^2 + (y - y_m)^2,$$

the following solution can be determined for the movement on the circular path $$r_0^2 = (a + t \cdot k_x - x_m)^2 + (b + t \cdot k_y - y_m)^2.$$

According to the embodiment of the method according to the invention, in some cases all the movements can be recorded that are performed with a holonomic vehicle. In order to be able to avoid possible collisions, the following can be provided:

A general formulation of the movement of the industrial truck along a circular path, which assumes no alignment in the direction of the circle tangent.

An extension of the movement model to have as needed a movement of the industrial truck along a straight line, so-called "Straight Line Movements", with consideration of an undetermined alignment of the industrial truck.

That can also be an extension to polygonal vehicle forms, that is, other contours of the industrial truck can be envisaged.

A hierarchical collision model for vehicles, such as an omnidirectional vehicle, which cannot be presented through a single polygonal structure. This hierarchical presentation can also increase the efficiency, since at a relatively large distance from obstacles, work can be done only with a simple polygonal contour, which can be refined as desired when closer to obstacles.

To test which movements in the case of an already detected collision lead to an improvement of the calculated "collision value", in order to make possible free travel of the industrial truck.

If necessary, receipt of the laser scanner data (generally: data from the measuring apparatus) and if necessary from odometer values in secure technology.

Depending on the embodiment of the industrial truck according to the invention, which in particular can be set up as an autonomous robot, this moves along a circular path or on a straight line.

To simplify matters, one can lay the coordinate system in the center of the mobile industrial truck. Now the obstacle points, which can be recognized with the laser (generally: measurement apparatus), move practically in a circular path on the mobile platform (industrial truck).

Now, depending on the embodiment, one may proceed as follows:
1) Calculation for each laser point as to whether it collides with the vehicle (e.g., given the current circular path set by the user or by a navigation system),
2) If "yes," calculation of the collision point,
3) Calculation of the distance on the circular path from the obstacle to the point of the possible collision,
4) Calculation of the maximum velocity that will allow braking.

With a rectangular industrial truck, the collision is preferentially calculated for 4 straight pieces.

With a polygonal industrial truck, preferentially this calculation will be made for as many straight pieces as necessary in order for example to model the contour as exactly as possible.

Embodiments of the invention are given as examples in the attached schematic figures. These show.

Figure 1:
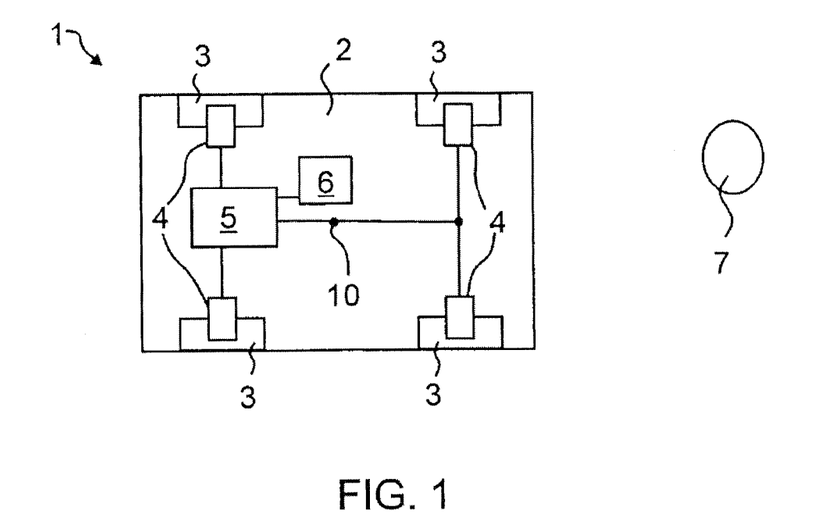
FIG. 1—a top view of a holonomic industrial truck schematic presentation.

FIG. 1 in a top view shows schematically an autonomous industrial truck, which in particular is shaped as a holonomic industrial truck 1. Since the industrial truck is a holonomic industrial truck, it can move freely in all directions; what is involved here in the industrial truck 1 is an omnidirectional vehicle.

In the case of this embodiment example, the industrial truck 1 has a vehicle basic body 2 and at least 3 omnidirectional wheels 3, which are labeled as mecanum wheels. Such wheels include for example a stored rotatable rim, on which several rolling bodies can be stored without drives. The rim can be driven by a drive. In the case of this embodiment example, the wheels 3 are each driven with an electric drive 4.

The industrial truck 1 also has a steering apparatus 5 set on the vehicle basic body 2, which is connected with the drives 4. A calculation program runs on the control apparatus 5, which steers the drives 4 in such a way that they move so that the industrial truck 1 moves with a pre-determined speed and a pre-determined movement direction or on a defined circular path around a roll center defined as desired.

The industrial truck 1 also includes a distance measuring apparatus 6 connected with the control apparatus 5 and for example set up on the vehicle basic body 2. The distance measuring apparatus 6 includes for example a laser scanner and is set to recognize an obstacle 7, so that if necessary the control apparatus 5 or a calculation program running on the control apparatus 5 can calculate a distance to the obstacle 7 and, on the basis of the present movement of the industrial truck 1, can recognize a potential collision of the industrial truck 1 with the obstacle 7.

Figure 2:
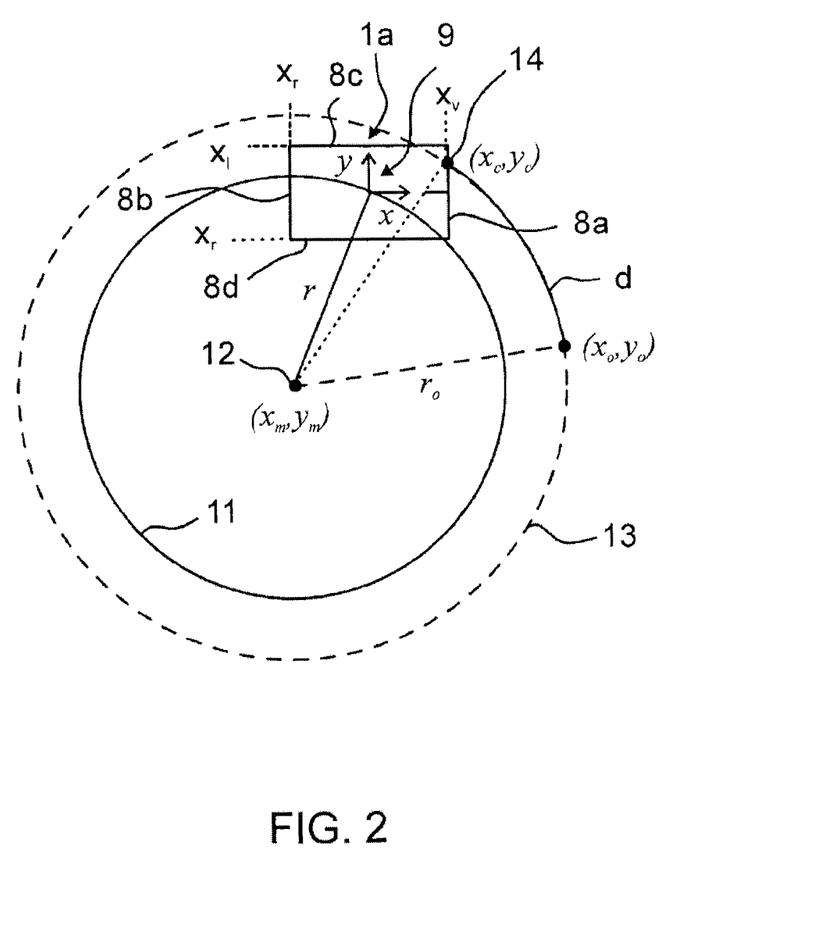
FIGS. 2, 3—top views of the modeled contour of the industrial truck.
Figure 3:
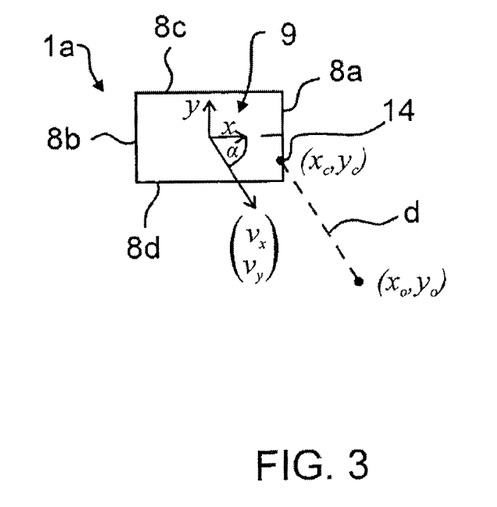

In the case of this example of an embodiment, a model 1a of the industrial truck 1 is stored in the control apparatus 5 and shown in FIGS. 2 and 3, which in particular model the contour of the industrial truck 1. In particular the contour of the industrial truck 1 is approximated by straight pieces and/or arc-shaped pieces. In the case of this example of the embodiment, the contour of the industrial truck 1 is described as a rectangle with 4 straight pieces 8a-8d.

Moreover, the distance between the industrial truck 1 and the obstacle 7 is described in the vehicle's coordinates x, y, whereby for example the x axis in this coordinate system 9 runs parallel to the straight pieces 8c, 8d, and the y axis of this coordinate system 9 runs parallel to the straight pieces 8a, 8b. The corresponding coordinate system 9 is for example placed in the center 10 of the industrial vehicle 1. In this way the contour of the modeled industrial vehicle 1 can also be described in the coordinates of the coordinate system 9. For example, if the side of the industrial vehicle 1, which points in the direction of the x axis of the coordinate system 9, is seen as the front side of the industrial vehicle 1, then the straight piece 8a describes the front side of the industrial vehicle 1 with the x coordinate $x_{vor}$; the straight piece 8b describes the back side of the industrial vehicle 1 with the coordinate $x_{rück}$; the straight piece 8c describes the left side of the industrial truck 1 with the y coordinate $y_{links}$; and the straight piece 8d describes the right side of the industrial truck 1 with the y coordinate $y_{rechts}$.

If it is now assumed that the industrial truck 1 moves in a circular path 11 with radius r and roll center 12 with the vehicle's coordinates $(x_m, y_m)$, and the position of the obstacle 7 has the vehicle's coordinates $(x_0, y_0)$, then there is a quadratic distance $r_0^2$ of the obstacle 7 to the roll center 12

$$r_0^2 = (x - x_m)^2 + (y - y_m)^2.$$

At the same time this equation describes the trajectory 13 of the obstacle 7 in the vehicle's coordinate system 9 of the industrial truck 1. The role center 12 in English is called the "Instantaneous Center of Curvature".

The radius r of the circular path 11 can be determined by the control apparatus 5, for example on the basis of an entry by an operator, on the basis of a command of a navigation system not given in more detail here, or on the basis of the steering of the wheels 3 or their drives 4.

If calculation is now made of the particular points or places 14 at which the contour of the industrial truck 1 cuts the trajectory 13 of the obstacle 7, this can be performed as follows:

$$r_0^2 = (x_c - x_m)^2 + (y_c - y_m)^2,$$

whereby $(x_c, y_c)$ are the coordinates of the point in the vehicle's coordinate system 9.

In the case of this embodiment example, the industrial truck 1 is modeled according to the model 1a, that is, with a rectangular contour and straight pieces 8a-d. In this way potential points 14 or places 14 of the contour that potentially collides with the obstacle 7 can be calculated as follows:

If the point or place 14 lies on the straight piece 8a, that is on the front, then the following coordinates result for this point 14:

$$x_c = x_{vor}$$

$$y_c = y_m \pm \sqrt{r_0^2 - (x_{vor} - x_m)}$$

If the point or place 14 lies on the straight piece 8c, that is on the left side of the industrial truck 1, then the following coordinates result for this point 14:

$$x_c = x_{links}$$

$$y_c = y_m \pm \sqrt{r_0^2 - (x_{links} - x_m)}$$

If the point or place 14 lies on the straight piece 8d, that is on the right side of the industrial truck 1, then the following coordinates result for this point 14:

$$x_c = x_{rechts}$$

$$y_c = y_m \pm \sqrt{r_0^2 - (x_{rechts} - x_m)}$$

If the point or place 14 lies on the straight piece 8b, that is on the back side, then the following coordinates result for this point 14:

$$x_c = x_{rück}$$

$$y_c = y_m \pm \sqrt{r_0^2 - (x_{rück} - x_m)}$$

Since in the case of this embodiment example the origin of the coordinate system 9 lies in the center 10 of the industrial truck 1, the following also apply:

$$x_{rück} \leq x_c \leq x_{vor}$$

$$y_{rechts} \leq y_c \leq x_{links}$$

With this, the control apparatus 5 can calculate for the points or places 14 the distance d to the next collision with the obstacle 7, in that the angle distance between the point 14 and the obstacle 7 is determined; this is calculated with the radius r with regard to the roll center 12.

This embodiment example involves for the industrial truck 1 an omnidirectional vehicle. With it, the industrial vehicle 1 does not necessarily move in the direction of its orientation, but in any desired angle α relative to it. From here movements along a straight line are possible in which a collision with the obstacle 7 is possible at two points 14. This is shown in FIG. 3.

Let $$\begin{pmatrix} v_x \\ v_y \end{pmatrix} = \begin{pmatrix} \cos\alpha \\ \sin\alpha \end{pmatrix}$$

be a vector that represents the movement direction in the vehicle's coordinate system 1. The trajectory of obstacle 7 is hereby determined by $$\begin{pmatrix} x \\ y \end{pmatrix} = \begin{pmatrix} x_0 \\ y_0 \end{pmatrix} + u \cdot \begin{pmatrix} v_x \\ v_y \end{pmatrix}; u \in R$$

With the following rules, the control apparatus 5 can now be limited in the search for point 14 (collision point) with the coordinates ($x_c$, $y_c$) to two sides each S of the contour of the industrial truck relative to a given velocity:

If $v_x>0$ then the point 14 potentially is found on the front side of the industrial truck 1 corresponding to the straight piece 8a.

If $v_y>0$, then the point 14 potentially is found on the left side of the industrial truck 1 corresponding to the straight piece 8c.

If $v_y<0$, then the point 14 potentially is found on the right side of the industrial truck 1 corresponding to the straight piece 8d.

If $v_x<0$, then the point 14 potentially is found on the back side of the industrial truck 1 corresponding to the straight piece 8b.

The cutting point of the obstacle trajectory with the contour of the industrial truck 1 and the distances d to the obstacle 7 are calculated as follows:

If the point or the location 14 lies on the straight piece 8a, that is, in the front, then the following coordinates result for this point 14:

$$x_c = x_{vor}$$

$$y_c = y_0 + d \cdot v_y$$

from which the distance d is calculated as $$d = \frac{x_{vor} - x_0}{v_x}$$

If the point or the location 14 lies on the straight piece 8c, that is, on the left side of the industrial truck 1, then the following coordinates result for this point 14:

$$y_c = y_{links}$$

$$x_c = x_0 + d \cdot v_x$$

from which the distance d is calculated as $$d = \frac{y_{links} - y_0}{v_y}$$

If the point or the location 14 lies on the straight piece 8d, that is, on the right side of the industrial truck 1, then the following coordinates result for this point 14:

$$y_c = y_{rechts}$$

$$x_c = x_0 + d \cdot v_x$$

from which the distance d is calculated as $$d = \frac{y_{rechtss} - y_0}{v_y}$$

If the point or the location 14 lies on the straight piece 8b, that is, on the rear side, then the following coordinates result for this point 14:

$$x_c = x_{rück}$$

$$y_c = y_0 + d \cdot v_y$$

from which the distance d is calculated as $$d = \frac{x_{rück} - x_0}{v_x}$$

Given, the contour of a vehicle edge of the industrial truck 1 lies in a parametrized form relative to the vehicle's coordinate system 9 as follows:

$$\begin{pmatrix} a \\ b \end{pmatrix} + t \cdot \begin{pmatrix} k_x \\ k_y \end{pmatrix}; t \in [t_{start}, t_{end}]$$

whereby $(k_x, k_y)^T$ is the direction vector of the edge in the vehicle's coordinate system 9 and the parametrization for the values $$t \in [t_{start}, t_{end}]$$

runs along the edge.

Through a cut with a circle, which is described by using the equation already noted above to reach the following equation $$r_0^2 = (x - x_m)^2 + (y - y_m)^2$$

then the following solution results for the group on the circular path:

$$r_0^2 = (a + t \cdot k_x - x_m)^2 + (b + t \cdot k_y - y_m)^2$$

This can be reformulated as $$t^2 + 2 \frac{k_x(a - x_m) + k_y(b - y_m)}{k_x^2 + k_y^2} t - \frac{r_0^2}{k_x^2 + k_y^2} = 0$$

When solved for t, the following results:

$$t_{1;2} = -\frac{k_x(a-x_m)+k_y(b-y_m)}{k_x^2+k_y^2} \pm \sqrt{\frac{(k_x(a-x_m)+k_y(b-y_m))^2}{(k_x^2+k_y^2)^2} - \frac{r_0^2}{k_x^2+k_y^2}}$$

For movement along a straight line, the problem can be solved by a cut of 2 straight lines. That means that one sets the obstacle trajectory according to the equation $$\begin{pmatrix} x \\ y \end{pmatrix} = \begin{pmatrix} x_0 \\ y_0 \end{pmatrix} + u \cdot \begin{pmatrix} v_x \\ v_y \end{pmatrix}; u \in R$$

with the parametrized presentation of the industrial truck 1 according to equation $$\begin{pmatrix} a \\ b \end{pmatrix} + t \cdot \begin{pmatrix} k_x \\ k_y \end{pmatrix}; t \in [t_{start}, t_{end}]$$

equal to $$\begin{pmatrix} a \\ b \end{pmatrix} + t \cdot \begin{pmatrix} k_x \\ k_y \end{pmatrix} = \begin{pmatrix} x_0 \\ y_0 \end{pmatrix} + u \cdot \begin{pmatrix} v_x \\ v_y \end{pmatrix}.$$

If the industrial truck 1 for example requires a robot not illustrated further and if the contour of the industrial truck with a robot is given by a more complex polygon, then the following hierarchical implementation can be used to increase efficiency.

The contour of the robot is approximated by an enclosing rectangle, and the collision avoidance is performed based on this rectangle. If the obstacle 7 is found within this approximated rectangle, the collision avoidance can be calculated with a more exact, more expansive polygon. This permits an efficient calculation for the majority of the cases that occur (obstacles 7 outside the approximate rectangle), but it also guarantees that in violations of a safety zone a "free travel" of the robot can occur based on exact analyses.

If the obstacle 7 is found within a safety zone around the robot, it can then be provided that all the movements through the collision avoidance system cannot generally be avoided. Rather an analysis can be done as to whether the intended movement strengthens the violation of the safety zone or leads to a reduction of the violation of the safety zone. In the latter case, the movement with possibly reduced velocity of the collision avoidance system can be guaranteed in order to allow a "free travel" of the robot. The decision as to whether an intended movement strengthens a safety zone violation can be made on the basis of considerations of indications from the calculated distance and the intended movement.

After the control apparatus 5 has determined the distance d between the point 14 on the obstacle 7, it sets the maximum velocity with which the industrial truck 1 can move, for the current movement in a way that the industrial truck 1 reliably comes to a standstill in front of the obstacle 7 on the basis of a possible braking of the industrial truck 1.

The invention claimed is:

1. A method for operating an autonomous industrial truck, having the following method steps:
    by means of a measuring apparatus of an autonomous industrial truck determining whether the industrial truck potentially collides with at least one obstacle on the basis of the present movement of said industrial truck, determining those points of the industrial truck at which the obstacle will potentially be hit,
    determining the distance between the obstacle and the point of the industrial truck, and
    determining a maximum velocity of the present movement of the industrial truck on the basis of the determined distance, with the result that the industrial truck reliably comes to a standstill in front of the obstacle on the basis of possible braking of the industrial truck; wherein the movement of the industrial truck runs along a circular path or on a straight line,
    wherein movement of the obstacle relative to the industrial truck is determined according to the equation $r_0^2 = (x-x_m)^2 + (y-y_m)^2$ whereby the industrial truck moves in a circular path with the radius and the instant center of rotation with the vehicle's coordinates $(x_m, y_m)$; and the position of the obstacle is described with the vehicle's coordinates $(x_0, y_0)$, and $r_0$ is the distance of the obstacle to the instant center of rotation.

2. The method according to claim 1, in which the industrial truck takes the form of an holonomic industrial truck and/or the measurement apparatus takes the form of a laser scanner.

3. The method according to claim 1, in which the determination of the distance between the obstacle and the industrial truck is determined by the vehicle's coordinates, and in particular the origin of the corresponding vehicle's coordinate system lies in the center of the industrial truck.

4. The method according to claim 1, in which the contour of the industrial truck in particular is modeled by means of straight pieces and/or arc shaped pieces and the point lies on the modeled contour.

5. The method according to claim 4, in which the contour of the industrial truck is approximated as a rectangle.

6. The method according to claim 1, in which the coordinates $(x_c, y_c)$ of the point are determined according to the equation $r_0^2 = (x_c-x_m)^2 + (y_c-y_m)^2$.

7. The method according to claim 6, in which the contour of the industrial truck is modeled as a rectangle with straight pieces, whereby the front side of the industrial truck is modeled with a first straight piece, the back side of the industrial truck is modeled with a second straight piece, the left side of the industrial truck is modeled with a third straight piece, and the right side of the industrial truck is modeled with a fourth straight piece; and
    the coordinates of points are calculated as:

$x_c = x_{vor}, y_c = y_m \pm \sqrt{r_0^2 - (x_{vor}-x_m)}$, if the point is set to the first straight piece, $x_c = x_{rück}, y_c = y_m \pm \sqrt{r_0^2 - (x_{rück}-x_m)}$, if the point is set as the second straight piece, $x_c = x_{links}, y_c = y_m \pm \sqrt{r_0^2 - (x_{links}-x_m)}$, if the point is set at the third straight piece, $x_c = x_{rechts}, y_c = y_m \pm \sqrt{r_0^2 - (x_{rechts}-x_m)}$, if the point is set as the fourth straight piece.

8. The method according to claim 1, in which the industrial truck moves at an angle ($\alpha$) relative to its orientation along a straight line, $$\begin{pmatrix} v_x \\ v_y \end{pmatrix} = \begin{pmatrix} \cos\alpha \\ \sin\alpha \end{pmatrix}$$

is a vector that represents the movement direction within the vehicle's coordinate system, so that the trajectory of the obstacle is determined by $$\begin{pmatrix} x \\ y \end{pmatrix} = \begin{pmatrix} x_0 \\ y_0 \end{pmatrix} + u \cdot \begin{pmatrix} v_x \\ v_y \end{pmatrix}; u \in R.$$

9. The method according to claim 8, by which the positions of the potential points are determined according to the following rule:
   If $v_x > 0$ then the point potentially is found on the front side of the industrial truck corresponding to the first straight piece,
   If $v_x < 0$ then the point potentially is found on the back side of the industrial truck corresponding to the second straight piece,
   If $v_y > 0$ then the point potentially is found on the left side of the industrial truck corresponding to the third straight piece, and
   If $v_y < 0$ then the point potentially is found on the right side of the industrial truck corresponding to the fourth straight piece.

10. The method according to claim 9, in which the distance between the point and the obstacle is determined according to the following rule:
    If the point lies on the first straight piece, then the resulting coordinates for the point are $x_c = x_{vor}$ and $y_c = y_0 + d \cdot v_y$ and the distance is $$d = \frac{x_{vor} - x_0}{v_x}$$

If the point lies on the second straight piece, then the resulting coordinates for the point are $x_c = x_{rück}$ and $y_c = y_0 + d \cdot v_y$ and the distance is $$d = \frac{x_{rück} - x_0}{v_x}$$

If the point lies on the third straight piece, then the resulting coordinates for the point are $y_c = y_{links}$ and $x_c = x_0 + d \cdot v_x$ and the distance is $$d = \frac{y_{links} - y_0}{v_y}$$

If the point lies on the fourth straight piece, then the resulting coordinates for the point are $y_c = y_{rechts}$ and $x_c = x_0 + d \cdot v_x$ and the distance is $$d = \frac{y_{rechtss} - y_0}{v_y}.$$

11. The method according to claim 1, in which the contour of a vehicle edge of the industrial truck in its parameterized form relative to the vehicle's coordinate system appears as follows:

$$\begin{pmatrix} a \\ b \end{pmatrix} + t \cdot \begin{pmatrix} k_x \\ k_y \end{pmatrix}; t \in [t_{start}, t_{end}]$$

whereby $(k_x, k_y)^T$ is the direction vector of the edge in the vehicle's coordinate system and the parameterization for values
$t \in [t_{start}, t_{ende}]$ runs along the edge and through a cut with the circle, which is described by means of the equation $r_0^2 = (x - x_m)^2 + (y - y_m)^2$, then the following solution results for the movement on the circular path:

$r_0^2 = (a + t \cdot k_x - x_m)^2 + (b + t \cdot k_y - y_m)^2.$

12. An autonomous industrial truck, having a vehicle basic body, with wheels set on the vehicle basic body, at least one drive for driving at least one of the wheels, a measuring apparatus that is set up to determine whether on the basis of the current movement the industrial truck potentially collides with an obstacle, and a control apparatus connected with the measuring apparatus that is set up to control the drive and is set up to operate the industrial truck according to the method of claim 1.

* * * * *

UNITED STATES PATENT AND TRADEMARK OFFICE
CERTIFICATE OF CORRECTION

PATENT NO. : 9,145,286 B2
APPLICATION NO. : 13/636210
DATED : September 29, 2015
INVENTOR(S) : Patrick Pfaff et al.

It is certified that error appears in the above-identified patent and that said Letters Patent is hereby corrected as shown below:

In the Specification
Column 3, Line 5, reads "if the point I set on the fourth straight piece" and should read -- if the point is set on the fourth straight piece --.

Column 3, Lines 16-20, reads "so that the trajectory of the obstacle is determined by $$\begin{pmatrix} x \\ y \end{pmatrix} - \begin{pmatrix} x_0 \\ y_0 \end{pmatrix} + u \begin{pmatrix} v_x \\ v_y \end{pmatrix}, u \in R$$

]," and should read -- so that the trajectory of the obstacle is determined by $$\begin{pmatrix} x \\ y \end{pmatrix} - \begin{pmatrix} x_0 \\ y_0 \end{pmatrix} + u \begin{pmatrix} v_x \\ v_y \end{pmatrix}, u \in R$$

--.

Column 3, Line 60, reads "$y_c = y_{links}$ and $x_c = x_o + x_o + d \cdot v_x$" and should read
-- $y_c = y_{links}$ and $x_c = x_o + d \cdot v_x$ --.

Column 4, Line 23, reads "$t \in [^{end}_{start}, t_{ende}]$" and should read -- $t \in [t_{start}, t_{end}]$ --.

Column 6, Lines 40-42, read "potential points 14 or places 14 of . . . that potentially collides with the obstacle 7" and should read -- potential points 14 or places 14 of . . . that potentially collide with the obstacle --.

Column 6, Line 46, reads "$x_c x_{vor}$" and should read -- $x_c = x_{vor}$ --.

Column 6, Line 53, reads "$x_c x_{links}$" and should read -- $x_c = x_{links}$ --.

Column 6, Line 60, reads "$x_c x_{rechts}$" and should read -- $x_c = x_{rechts}$ --.

Column 6, Line 65, reads "$x_c x_{rück}$" and should read -- $x_c = x_{rück}$ --.

In the Claims
Column 12, Line 38, Claim 11, reads "$t_{ende}$" and should read -- $t_{end}$ --.

Signed and Sealed this
Seventh Day of June, 2016

Michelle K. Lee
*Director of the United States Patent and Trademark Office*